（12） United States Patent
Yoshioka

(10) Patent No.: US 6,748,514 B2
(45) Date of Patent: Jun. 8, 2004

(54) PARALLEL PROCESSOR AND IMAGE PROCESSING SYSTEM FOR SIMULTANEOUS PROCESSING OF PLURAL IMAGE DATA ITEMS WITHOUT ADDITIONAL CIRCUIT DELAYS AND POWER INCREASES

(75) Inventor: Keiichi Yoshioka, Sanda (JP)

(73) Assignee: Ricoh Company, Ltd., Tokyo (JP)

( * ) Notice: Subject to any disclaimer, the term of this patent is extended or adjusted under 35 U.S.C. 154(b) by 577 days.

(21) Appl. No.: 09/782,989

(22) Filed: Feb. 14, 2001

(65) Prior Publication Data

US 2001/0027513 A1 Oct. 4, 2001

(30) Foreign Application Priority Data

Feb. 15, 2000 (JP) .......................................... 2000-036938

(51) Int. Cl.[7] ............................ G06F 15/16; G06F 15/80
(52) U.S. Cl. ............................................. 712/13; 712/22
(58) Field of Search ........................... 712/13, 14, 20, 712/22, 28, 23, 30

(56) References Cited

U.S. PATENT DOCUMENTS

| 4,833,599 A | * | 5/1989 | Colwell et al. | ............. 712/236 |
| 5,815,723 A | * | 9/1998 | Wilkinson et al. | ............ 712/20 |
| 5,956,274 A | * | 9/1999 | Elliott et al. | ........... 365/189.04 |
| 5,991,866 A | * | 11/1999 | Heller et al. | ................... 712/10 |

FOREIGN PATENT DOCUMENTS

JP          8212169           8/1996

* cited by examiner

Primary Examiner—Henry W. H. Tsai
(74) Attorney, Agent, or Firm—Cooper & Dunham LLP

(57) ABSTRACT

A parallel processor and an image processing system incorporating such processor are disclosed. Control signals in the parallel processor are generated by an instruction sequence control unit, and divided into two: global control signals supplied to a local signal generator of arbitrary selected processor element group; and local control signals buffered by the local control signal generator and then supplied exclusively to the processor elements included in arbitrary selected processor element group. This construction of the processor alleviates deterioration in device characteristics and undesirable increase in driving power requirements.

23 Claims, 11 Drawing Sheets

POLY LAYER

FIELD LAYER

METAL 1 LAYER

PRIOR ART

PARALLEL PROCESSOR AND IMAGE PROCESSING SYSTEM FOR SIMULTANEOUS PROCESSING OF PLURAL IMAGE DATA ITEMS WITHOUT ADDITIONAL CIRCUIT DELAYS AND POWER INCREASES

BACKGROUND

1. Field

This patent specification relates to a parallel processor and an image processing system using such processor in digital duplication machines, facsimile apparatuses, and other similar image processing systems.

2. Discussion of the Background

Recent developments in digital duplication machines, facsimile apparatuses, and other imaging systems, have focused attention on improvement of image quality with increasing the number of picture elements and adopting color. Such recent trends have brought about an increase in the image data to be processed.

The processing of image data is carried out, in general, by repeating a similar set of processing steps over image data of picture elements. A single instruction multiple data stream (SIMD) type processor, therefore, has been found suitable due to its parallel data processing capabilities such that processing of a plurality of image data can be carried out by a single instruction.

FIG. 12 is a block diagram of a known SIMD processor. As shown in FIG. 12, the SIMD processor 1 includes at least a global processor (GP) 2, a processor element block 3 provided with a plurality of processor elements (PE) 3a, and an interface 4.

In order to process a plurality of data items simultaneously using a SIMD processor, the processor element block 3 has a plurality of processor elements (PE) 3a, as described above. Each of the processor elements 3a includes a register file 31 and an operation unit 36. The register file 31 includes a plurality of registers, and the operation unit 36 is configured to process data provided from the register file 31 and global processor 2.

Based on instructions by the global processor 2, the interface 4 is configured to provide data to be processed to an input/output (I/O) register file 31 in the processor, in which the data are input by, for example, an external scanner. The interface 4 is also configured to transfer processed data from the I/O register file 31 to an external unit such as, for example, a printer.

The global processor 2 operates to control both the processor element block 3 and interface 4. In addition, the global processor 2 includes at least a single instruction single data stream (SISD) type processor which operates to output various control signals.

As described above, the control with a SIMD processor is configured to execute a single instruction in every processor element 3a. Namely, in the SIMD processor, one control signal line is connected from the global processor 2 in common to each of the plurality of the processor elements 3a, and by sending an instruction by way of the thus formed control signal line, each of the processor elements 3a executes an identical operation processing based on this single instruction.

FIG. 13 is a schematic diagram illustrating the circuit interconnection including the processor elements and control signal line.

Referring to FIG. 13, in order to execute a single operation processing onto a plurality of data, a plurality of processor elements, PE0 through Pen are provided. In addition, each processor element 3a is provided with n registers, 31-1 through 31-$n$ (e.i., REG1 through REGn).

Control signals are sent from an instruction signal generator in the global processor 2 to each processor element 3a by way of the control signal line (CS).

Namely, two clock signals, CP and CN, are sent to the registers 31-1~31-$n$, from the global processor 2. These two signals CP and CN each have a sign opposing each other, in that the one signal is generated by inverting the sign of the other by means of an inverter. These clock signals CP and CN are then sent to each processor element 3a. Incidentally, FIG. 13 shows the case where CN signals are provided by way of even-numbered control lines, while CP signals are by way of odd-numbered lines.

Further, according to CP, CN clock input signals, registers 31-1 through 31-$n$ operate to latch data input into the D input of the register from the internal bus signal, and output data from P, Q terminals to an internal bus.

With the increase in the number of the processor element 3a in those known processors, however, the length of the control signal line increases from a driving circuit in the instruction signal generator to distant processor elements 3a toward the end terminal. As a result, a wiring delay of CS signals is caused among the processor element PE0 nearest to the driving circuit and those distant from the circuit such as, for example, the terminal processor PEn.

This gives rise to several drawbacks such as a reduction in circuit characteristics such as evidenced by circuit malfunction in extreme cases. In addition, this also necessitates relatively large power for driving the circuit.

An array processor is disclosed in Japanese Laid-Open Patent Application No. 8-212169, in which neighboring n processor elements constitute a group, and each of groups in the array processor is individually provided in common with one register and one control signal line.

Further, in that description, neighboring registers in the array processor are interconnected by a read bus and write bus, to thereby be able to operate a plurality of processor elements as a single processor. This may result in disadvantages in the array processor such as difficulties in shifting from one processor to another and in updating data in a specific processor, among others.

In addition, no description could be found in that document regarding the circuit wiring delay of CS signals which is caused among the processor element PE0 in the vicinity of an instruction sequence control unit and those distant from the unit such as, for example, the terminal processor PEn.

SUMMARY

Accordingly, it is an object of the present disclosure to provide an improved parallel processor with neither the above described circuit delay or undesirable increase in power for circuit driving.

The following brief description is a synopsis of only selected features and attributes of the present disclosure. A more complete description thereof is found below in the section entitled "Description of Preferred Embodiments"

A parallel processor disclosed herein includes a global processor configured to decode programs and assume overall control of the parallel processor; and a processor element block comprising a plurality of processor elements configured to process various data.

Each processor element contains a plurality of functional means including at least an operation unit and a register file provided with a plurality of registers, each functional means is connected to an internal bus, the operation of the functional means is controlled by a logic of global control signals generated by the global processor, the processor elements are divided into groups each including an arbitrary number thereof, buffer means t buffer the control signals in each of the groups, the global control signals are input into the buffer means, local control signals are generated by the buffer means and sent to each of the groups to be subsequently terminated within each of the groups, and the global control signals are provided to all of the buffer means in the groups.

In addition, the transfer and exchange in the parallel processor of data among the functional means are carried out by way of the internal bus, the buffer means is provided in the middle of the group of an arbitrary number of the processor elements.

Further, in the parallel processor, the circuit interconnection for the global control signals is provided in the uppermost metal layer in the IC layout process and shielded by power lines.

Still further, the global control signals are input into the buffer means included in the group of an arbitrary number of the processor elements, and the operation of the functional means in the group of an arbitrary number of the processor elements is controlled by the local control signals generated by the buffer means.

According to another aspect, an image processing system disclosed herein is configured to input image data, operates to parallel process the image data, and outputs processed data to an external unit.

The image processing system includes the parallel processor containing a plurality of processor elements provided to form an array for the image data to be input, and a first-in first-out (FIFO) memory to perform at least one of the inputting operation of the image data and an outputting operation of the processed data to the external unit, by way thereof.

The processor elements each includes a plurality of functional means including at least an operation unit and a register file provided with a plurality of registers, each functional means is connected to an internal bus, the transfer and exchange of data among the functional means are carried out by way of the internal bus, the operation of the functional means is controlled by a logic of global control signals generated by the global processor, the processor elements are divided into groups each including an arbitrary number thereof, a buffer means to buffer the control signals is provided in each of the groups, the global control signals are input into the buffer means, local control signals are generated by the buffer means and sent to each of the groups to be subsequently terminated within each of the groups, the global control signals are provided to all buffer means in the groups, and the processed data are output to the external unit in response to the global control signals.

In addition, in the image processing system, the buffer means is provided in the middle of the group of an arbitrary number of the processor elements, the circuit interconnection for the global control signals is provided in the uppermost metal layer in the IC layout process and shielded by power lines.

Further, the global control signals are input into the buffer means included in the group of an arbitrary number of the processor elements, and the operation of the functional means in the group of an arbitrary number of the processor elements is controlled by the local control signals generated by the buffer means.

According to still another aspect, a method disclosed herein for inputting image data, operating to process the image data, and outputting processed data to an external unit, for the image processing system, includes the steps of inputting the image data into a parallel processor containing a plurality of processor elements provided forming an array, performing at least one of the inputting operation of the image data, and outputting operation of the processed data to the external unit, by way a FIFO memory.

The image processing system incorporating the parallel processor, which is utilized in the method, has the construction and capabilities described herein above.

The present disclosure and features and advantages thereof will be more readily apparent from the following detailed description and appended claims when taken with drawings.

BRIEF DESCRIPTION OF THE DRAWINGS

In the following drawings, like references numerals will be used to refer to like elements in the various drawings, in which.

DESCRIPTION OF PREFERRED EMBODIMENTS

In the detailed description which follows, specific embodiments of a parallel processor and a system incorporating the processor particularly useful in image data processing are described. It is understood, however, that the present disclosure is not limited to these embodiments. For example, it is appreciated that the parallel processor disclosed herein may also be adaptable to any form of data processing, particularly parallel data processing. Other embodiments will be apparent to those skilled in the art upon reading the following description.

Figure 1:
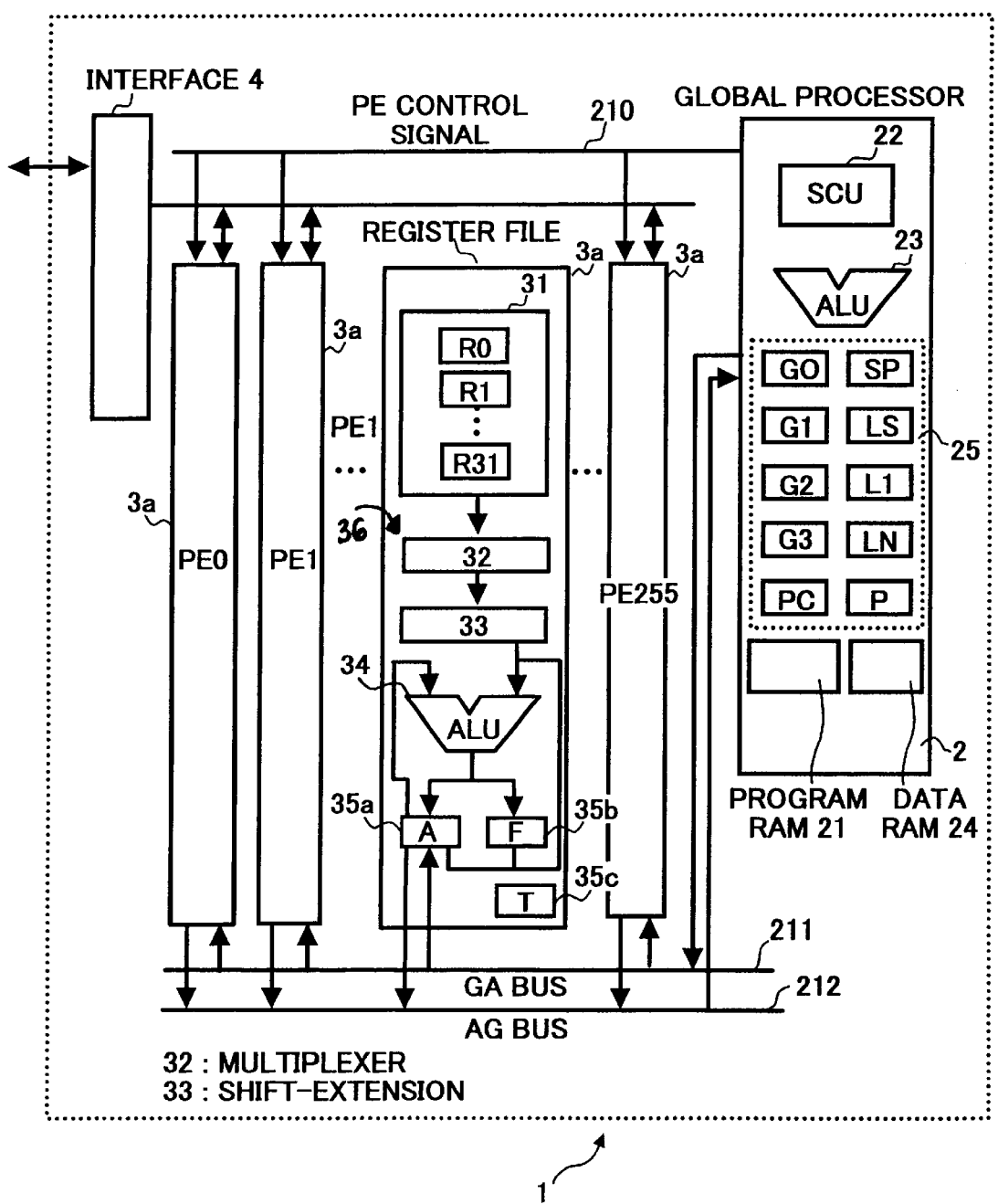
FIG. 1 is a block diagram illustrating the overall circuit construction of a SIMD processor according to one embodiment disclosed herein.

FIG. 1 is a block diagram illustrating the overall circuit construction of a SIMD processor according to one embodiment disclosed herein.

Referring to FIG. 1, a SIMD processor disclosed herein includes at least a global processor (GP) 2, a processor element block 3 which is provided with a plurality of processor elements (PE) 3a, being exemplified by 256 processor elements in the present embodiments, and an interface 4.

In response to instructions from the global processor 2, the interface 4 is configured to provide data to be processed to an input/output (I/O) register file 31 in the processor, in which the data is input by, for example, an external scanner; and to transfer processed data from the I/O register file 31 to an external unit such as, for example, a printer.

The processor element block 3 includes at least a register file 31 and an operation array 36. The register file 31 operates to store several items of image data. Some of the data are input by an input unit such as, for example, an external scanner, to be subsequently processed, others are to be output to an external unit such as, for example, a printer. The operation array 36 operates to process several items of data which are supplied by the register file 31 and the global processor 2.

The register file 31 includes at least a plurality of registers and carries out input/output operation steps between external units, the global processor 2, or operation array 36.

The global processor 2 assumes to control the processor element block 3 and includes a plurality of single instruction single data stream (SISD) type processors to supply various control signals.

As illustrated in FIG. 1, the global processor 2 includes at least a sequence unit (SCU) 22 which decodes instructions and then generates various control signals, an arithmetic and logic unit (ALU) 23 for carrying out arithmetic and logic operation processing based on instructions from the global processor, a RAM 21 for storing processor programs, a RAM 24 for storing operation data, and other several circuits (not shown) such as a cut-in control circuit, an external I/O control circuit, and a GP (global processor) operation control circuit.

In addition, the global processor 2 includes at least a register group 25 which consist of the following registers such as a program counter (PC) for storing addresses of the program, versatile registers such as G0~G3 registers for storing operational data, a stack pointer (SP) for storing addresses of shunting RAMs during either shunting or restoring period, a link register (LS) for storing a call originating address during the period of a subroutine call, a link interrupt (LI) register and a link non-maskable interrupt (LN) register for storing jump terminating addresses during interrupt request (IRQ) and non-maskable interrupt request (NMI) periods, respectively; and a processor status register (P) for storing the status of the processors.

Although not shown in FIG. 1, the SCU 22 is provided with a global processor instruction decoder (GPD) for decoding GP instructions and then creating control signals primarily into each block of the global processor 2, and a processor element instruction decoder (PDC) for decoding PE instructions and then creating control signals primarily into each block of the processor element block 3.

Namely, the instructions generated by the global processor are broadly divided into the GP instructions and the PE instructions. The former instructions take charge of operation processing in the global processor 2, while the latter PE instructions take charge of operation processing either within the processor element block 3 or among the processor elements 3a.

The PE instructions are supplied to each processor element 3a by way of PE control line 210. In addition, input/output process steps of various data between the global processor 2 and each of the processor elements 3a are carried out by way of buses 211 and 212.

The operational arrays 36 in the processor element 3a contains a multiplexer 32, shift extension circuit 33, arithmetic and logic unit (ALU) 34, A register 35a, and F register 35b.

The SCU 22 in the global processor 2 serves to send process setting data and instructions for transferring data to the interface. Based on process setting data and instructions for the SCU 22, the interface serves to generate various signals such as address control signals for addressing the processor element 3a, read/write signals for instructing read/write processing steps to the registers, 31-1, 31-2 and so on, in the processor element 3a; and clock control signals for creating clock signals.

Write signals of the above noted read/write signals instruct to acquire data, which are to be processed, from a data bus to be stored in the register file 31 in the processor element 3a. While read signals of the read/write signals are for the register to send data to a bus, in which the data are already processed and stored in register 31b in the processor element 3a.

The register file 31 includes 32 of 8-bits registers for each processor element 3a according to the present embodiment. The register file 31 contains 32 of 8-bits registers for each processor element 3a, to thereby constitute a register array containing those 32 registers for each of 256 PE's, thus amounting to 256 times 32 of registers.

The register file 31 thus includes the plurality of registers such as R0, R1, R2, . . . R31 for each processor element (PE) 3a. Each register file 31 is provided with one read port (QP) and one write port (D) for the operational array 36, and accessible from the operation array 36 by way of the 8-bits bus used for both reading and writing.

Twenty-four of the 32 registers are accessible from the exterior of the processor, to thereby form an arbitrary register be executed by read/write steps in response to externally input clock, address and read/write control signals.

The 32 registers are also configured to have external access to a register in any of the processor elements through one external port by addressing the number of that processor element (i.e., any one of 0 through 255). The number of the external port for the external access thus amounts to 24.

Although the registers 31 are described to be 8-bits in the present embodiment, other bit numbers may suitably be selected depending on the type of the data.

Upon receipt of write signals, the register file 31 acquires from a data bus and then stores the data to be processed. While upon the receipt of read signals, the register sends to a bus the data which are already processed and stored. The data may further be transferred through the interface to external units such as, for example, a printer by way of an external bus.

In addition, the register is connected to a multiplexer 32 by way of the data bus which is capable of transferring 8 bits parallel data. The data either to be processed or already processed by the ALU 34 can be transferred to the register 31 by way of the data bus.

The data transfer is carried out, according to control instructions sent from the sequence unit 22 of the global processor 2, by way of a read control signal line and a write control signal line, both of which are connected to the global processor 2.

Namely, when read instructions are received from the sequence unit 22 of the global processor 2 by way of the read control signal line, the register 31 places the data to be processed onto the data bus, in which the data are subsequently sent to ALU 34. In contrast, when write instructions are sent from the sequence unit 22 of the global processor 2 via write signal control line, the register 31 holds the data which are already processed by the ALU 34 and sent via the data bus.

The operational array 36 is provided with the multiplexer 32, shift extension circuit 33, 16-bits ALU 34, and 18-bits register 35 which is further provided with 16-bits A register 35a and F register 35b.

The processing steps executed by the instructions sent from the processor element 3a are carried out by inputting the data readout from the register file 31 into one of two inputs of the ALU 34, inputting the content in the A register of the register 35 into the other input of the ALU 34, and subsequently storing the processed results into the A register. The processing is therefore carried out among the A register 35a and R0~R31 registers in the register file 31.

The (7 to 1)-multiplexer 32 is provided herein to connect the register file 31 to the operational array 36, so as to select the data to be processed from seven processor elements 3a. That is, there selected as the data to be presently processed are those stored in neighboring processor elements up to three (i,e, 1, 2 and 3) toward the left, and similarly in three toward the right, each from the column of the multiplexer; and one in the center column of the processor elements.

In addition, 8-bits data in the register file 31 are shifted by arbitrary bits toward left by the shift extension circuit 33, to subsequently inputted into the AUL 34.

As indicated above, the multiplexer 32 is connected not only to a data bus of the processor element 3a located in its own column but also to six data buses of the neighboring processor elements 3a on both left and right sides of the column.

The multiplexer 32 can therefore be able to select one processor element 3a out of the seven, and sends the data, which are held in the register of thus selected processor element 3a, to the ALU 34. Alternately, the multiplexer 32 sends the data, which are already processed by the ALU 34 to the registers 31 of the selected processor element 3a.

With this configuration including the multiplexer, the processing data becomes feasible, which are stored in the registers 31b and 31c of processor elements 3a in the neighboring column. The processing capability of the SIMD type processor therefore increases considerably.

The shift extension circuit 33 serves to shift the data sent from the ALU 34 by a predetermined bits to subsequently send to ALU 34. Alternately, the shift extension circuit 33 shifts the processed data sent from the ALU 34 by a predetermined bits to subsequently send to multiplexer 32.

The ALU 34 serves to carry out arithmetic and logic operations onto both data, the ones sent from the shift extension circuit 33 and the others held in the register 35.

Although the data bit for the ALU 34 is so far described as 16 bits in the present embodiment, other data formats may suitably be selected depending on the type of the data.

The data subjected to the arithmetic and logic operations are subsequently held in the A register 35a to be transferred to either the shift extension circuit 33 or the versatile register 25 in the global processor 2. From the global processor 2 to the memory controller 5, several signals for I/O steps such as address, data and control signals are entered by way of a bus.

Further, the valid/invalid control for the processing execution is carried out for respective processor elements 3a by a conditional registers T (not shown). As a result, the selection of the data in a particular processor element 3a as those to be presently processed becomes feasible among the plurality of the processor elements.

Figure 2:
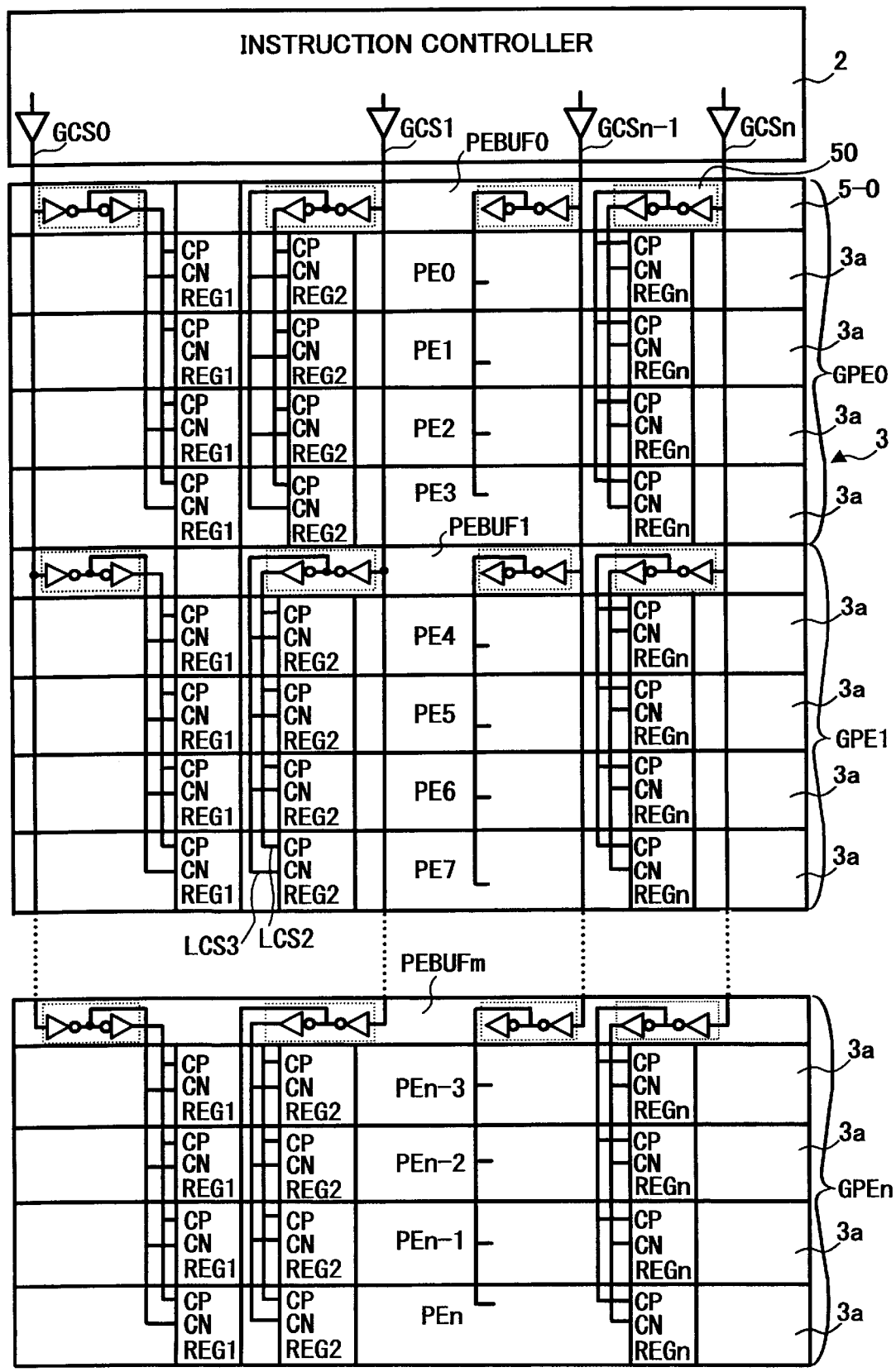
FIG. 2 is a schematic diagram illustrating the circuit interconnection including processor elements and control signal line of a parallel processor according to one embodiment disclosed herein.

FIG. 2 is a schematic diagram illustrating the circuit interconnection including the processor elements and control signal line of a parallel processor according to one embodiment disclosed herein Referring now to FIG. 2, there will be detailed herein below, on the transfer of control signals in the global processor 2, that is one of characteristic features disclosed herein.

As illustrated in FIG. 2, the control signals transfer is concerned with the control signals, which are sent from the global processor 2 to a plurality of processor elements 3a contained in the SIMD processor.

The detailed feature of the transfer disclosed herein is characterized by achieving suitable control thereof by means of the circuit layout utilizing multilayer metallization processes to suitably achieve both circuit arrangement and processor control such that desirable processor characteristics are accomplished.

Figure 3:
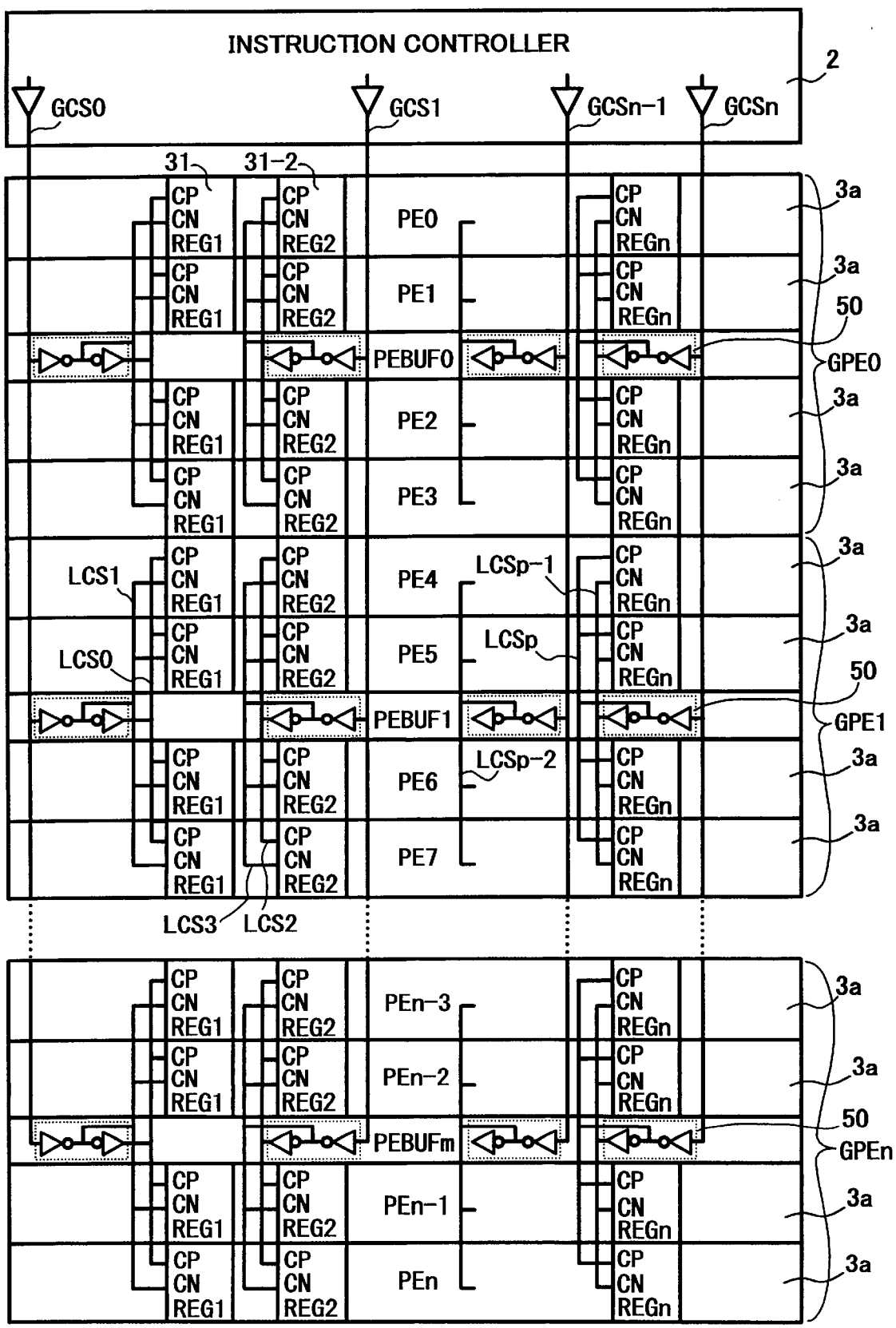
FIG. 3 is a schematic diagram illustrating the circuit interconnection including the processor elements and control signal line of the parallel processor according to another embodiment disclosed herein.

FIG. 2 is a block circuit diagram to illustrate the construction of a parallel processor according to one embodiment disclosed herein and FIG. 3 is a schematic diagram illustrating the circuit interconnection including the processor elements and control signal line of a parallel processor according to another embodiment disclosed herein.

A SIMD processor includes at least an instruction sequence control unit in the global processor 2 and a plurality of processor elements 3a (PE0~PEn).

The instruction sequence control unit serves to decode various instructions and supplies global control signals (GCS, GCS0~GCSn) to the plurality of processor elements 3a.

These processor elements 3a are further structured being divided into groups (GPE), each of which includes an arbitrary number of the processor elements 3a.

As illustrated in FIGS. 2 and 3, each group (GPE) in the present embodiment consists of four processor elements such as PE0~PE3, PE4~PE7, . . . and PE0n-3~PEn. In addition, each GPE is provided with several local control signal generator 50 (PEBUF, PEBUF0~PEBUFm).

Although the above group is so far described as four of the processor elements in the present embodiment, another division such as, for example, with eight or fourteen processor elements may suitably be selected depending on the type of the processor construction.

As described above, one local control signal generator 50 is provided for each group. Further, in the embodiment illustrated in FIG. 2, the local control signal generator 50 is located for the each group GPE toward the side of the instruction sequence control unit in the global processor 2;

while the local control signal generator 50 is located in the middle of the group GPE in the embodiment illustrated in FIG. 3.

By providing the local control signal generator 50 (PEBUF, PEBUF0~PEBUFm) in the middle of the group GPE as illustrated in FIG. 3, the length of the control signal line is decreased from a driving circuit in the instruction signal generator to distant processor elements 3a toward the end terminal. This reduction of the length becomes more effective with the increase in the number of the processor elements in the GPE, when compared with the generator 50 located at the end of the register array as illustrated in FIG. 2.

Since the length is decreased by half, for example, in the present embodiment, the signal delay in local buses can be alleviated and desirable processor characteristics can therefore be accomplished. Therefore, the structure of the processor as illustrated in FIG. 3 becomes more effective with increasing the number of the processor elements in the GPE.

The local control signal generator 50 serves to buffer global control signals (GCS) generated by the instruction sequence control unit in the global processor 2, and to generate local control signals (LCS, LCS0~LCSp).

The local control signals (LCS) are supplied exclusively to each GPE as control signals for the processor element 3a.

Figure 4:
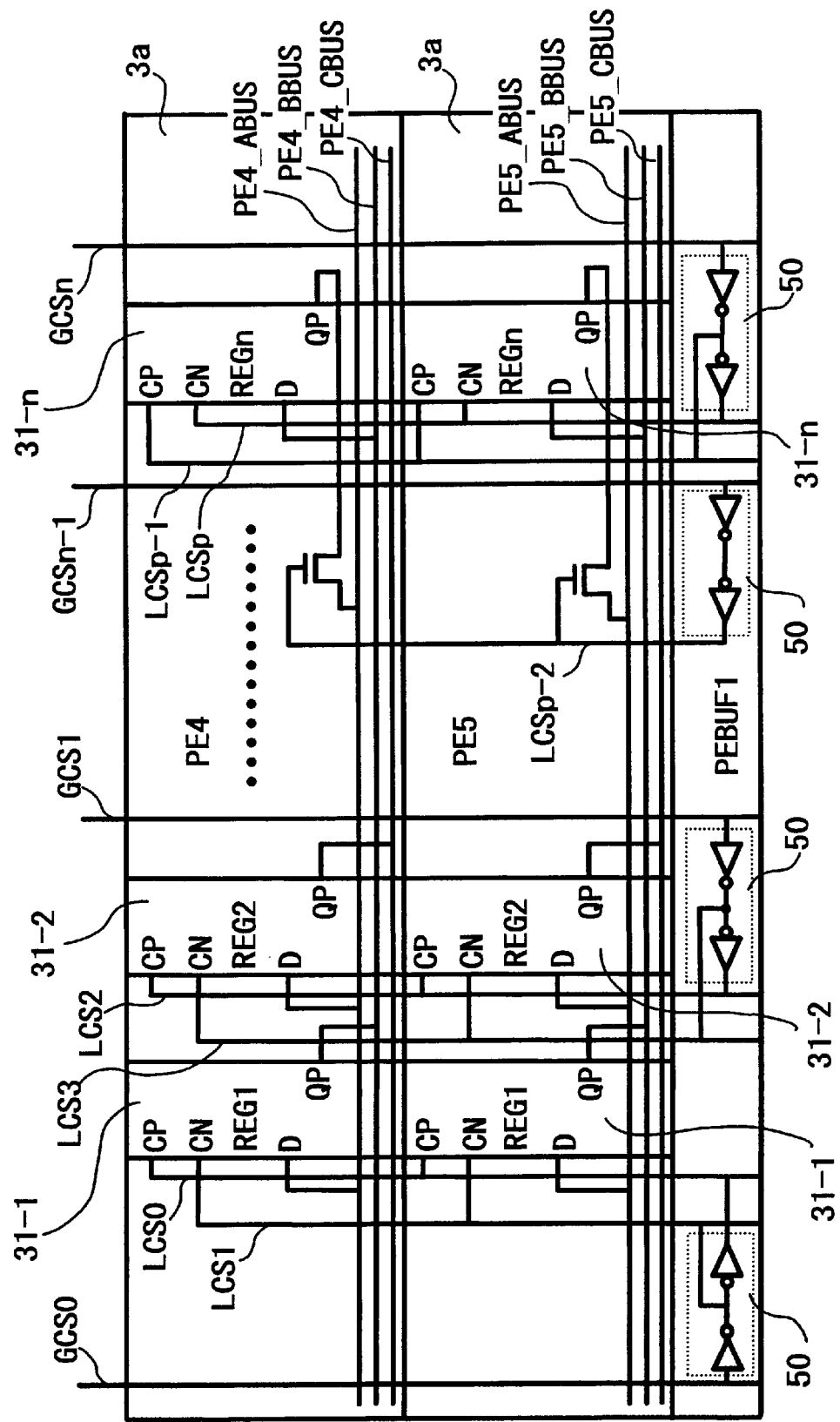
FIG. 4 is a schematic diagram illustrating the major portion of the processor according to one embodiment disclosed herein with the emphasis on the relative position of processor elements and local control signal generator.

FIG. 4 is a block circuit diagram to illustrate the major portion of the processor according to one embodiment disclosed herein with the emphasis on the relative position of processor elements and local control signal generator 50, in which a local control signal generator 50 and the processor elements PE4, PE5 are shown to exemplify a GPE.

As described earlier, each processor element 3a contains several functional units such as register means 31-1 including a latch circuit and others, arithmetic and logic operation processing circuit, shifter, counter and others. There illustrated in FIG. 4 are PE4, PE5, and local control signal generator (PEBUF1), including register means REG1, REG2, . . . REGn.

Figure 5:
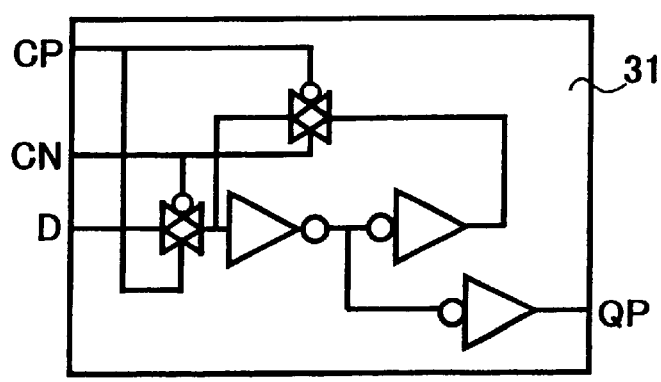
FIG. 5 is a block diagram illustrating the construction of a register according to one embodiment disclosed herein.
Figure 6:
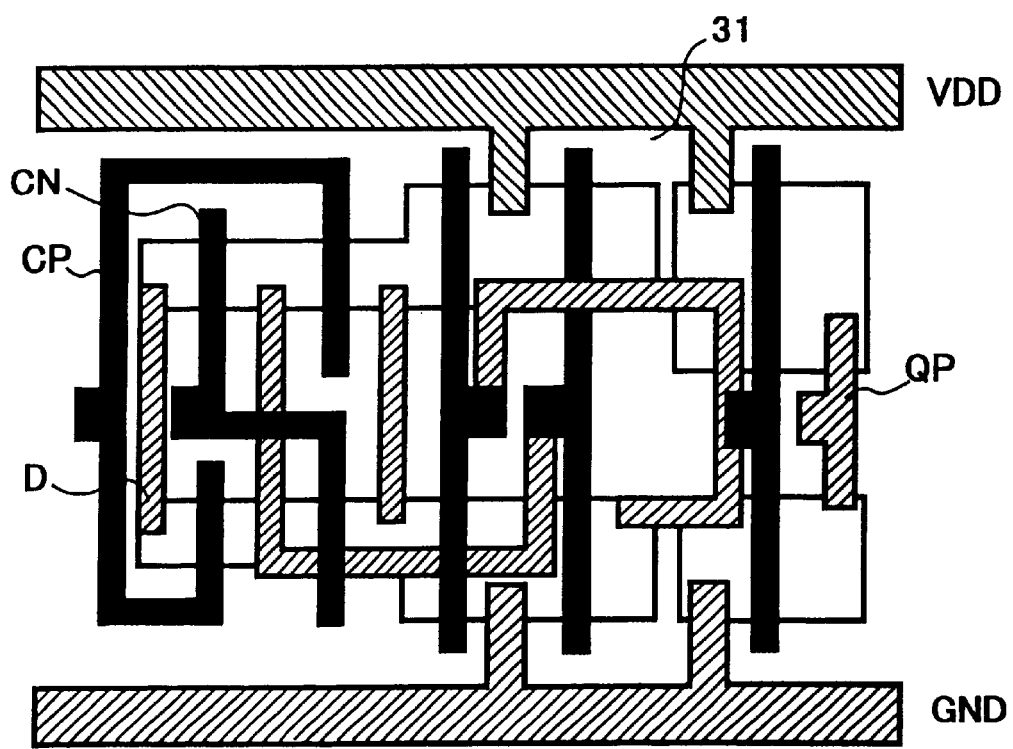
FIG. 6 includes a drawing illustrating the physical layout of the register of FIG. 5.
Figure 6:
Figure 6:
Figure 6:

FIG. 5 is a block diagram illustrating the construction of a register according to one embodiment disclosed herein, and FIG. 6 include a drawing illustrating the physical layout of the register of FIG. 5.

Referring to FIG. 5, the registers (REG) 31-1 etc. each includes a latch circuit, which has the circuit layout shown in FIG. 6.

As shown in FIG. 4, in order to carry out the data exchange among the registers, REG1, REG2, REGn in respective processor elements 3a are each connected to internal buses PE4-ABUS, BBUS, CBUS; and PE5-ABUS, BBUS, CBUS.

As shown in FIG. 5, the registers (REG) 31-1 etc. each operates, according to clock inputs by CP and CN signals, to latch signals input through its D terminal by way of an internal bus and also to output various data from QP terminal to another internal bus. For the register REGn, the terminal QP is connected to an internal bus by way of a gate which is activated as a switch by LCSp-2 signals.

The global control signals (GCS) generated by the instruction sequence control unit in the global processor 2 are buffered by the local control signal generator 50 (PEBUF1), and local control signals (LCS0~LCSp) are generated by the generator 50.

The local control signals (LCS) are each sent to registers 31-1 etc., as control signals for PE4 and PE5, which are, in turn, CP and CN clock signals in the case shown in FIG. 4.

For the registers n, the terminal QP is connected to an internal bus by way of a gate which is activated as a switch by LCSp-2 signals.

As described above, the control signals, which are generated by the instruction sequence control unit in the global processor 2, are divided into two and then supplied, which follows. Namely, the ones are global control signals (GCS) which are supped to local signal generator 50 (PEBUF1) of arbitrary selected processor element group (GPE), and the others are local control signals (LCS) which are buffered by the local control signal generator 50 (PEBUF1) and then supplied exclusively to the processor elements included in arbitrary selected processor element group (GPE).

In the previous construction of the processor, as aforementioned, control signals are supplied to all processor element by a single instruction sequence control unit in the global processor 2. As a result, the length of the control signal line increases and a relatively large load has to be placed for the driving circuit, thereby necessitating a huge buffer in instruction sequence control unit in the global processor 2 in order to suitably supply control signals to all of the processor elements.

In contrast, since the control signals are supplied exclusively to arbitrary selected processor element groups (GPE), the size of the buffer portion in the single instruction sequence control unit can be reduced.

Figure 13:
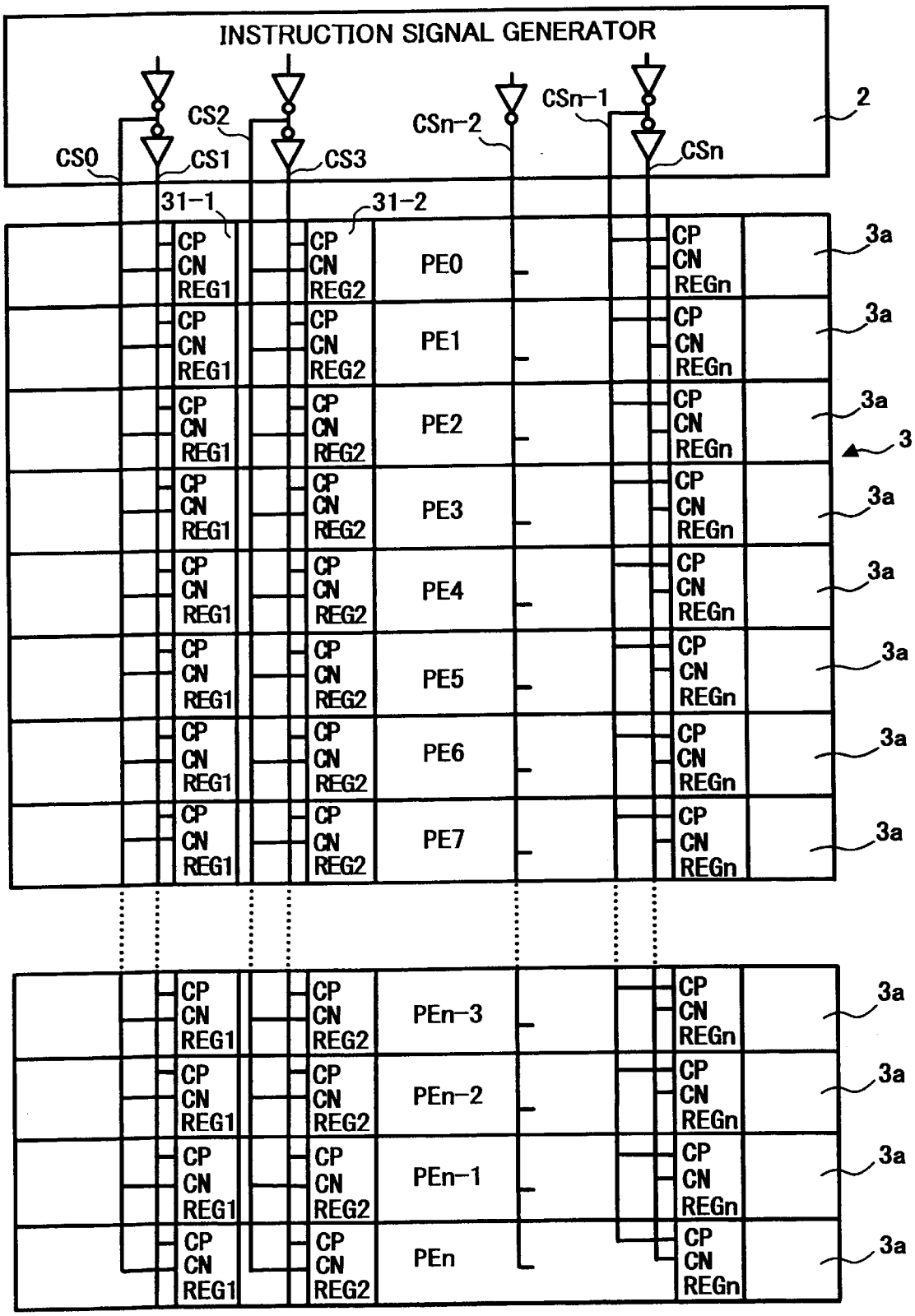
FIG. 13 is a schematic diagram illustrating the circuit interconnection including the processor elements and control signal lines of a known SIMD processor.

In addition, because of the aforementioned increased length of the control signal lines (such as CS0 and CS1, CS2 and CS3; . . . CSn-1 and CSn) in the previous processor as shown in FIG. 13, there can be signal skew effects, thereby resulting in further drawbacks such as deteriorating device characteristics, for example.

In contrast, since the control signals are buffered by the arbitrary unit (i.e., GPE) described earlier in the present construction of the processor disclosed herein, the number of the global signal lines can be reduced to one from the previous two lines. This is shown by the two lines CS0 and CS1 in FIG. 13, in contrast with one control line GCS in FIGS. 2 and 3. In addition, signal skew can also be alleviated.

Figure 7:
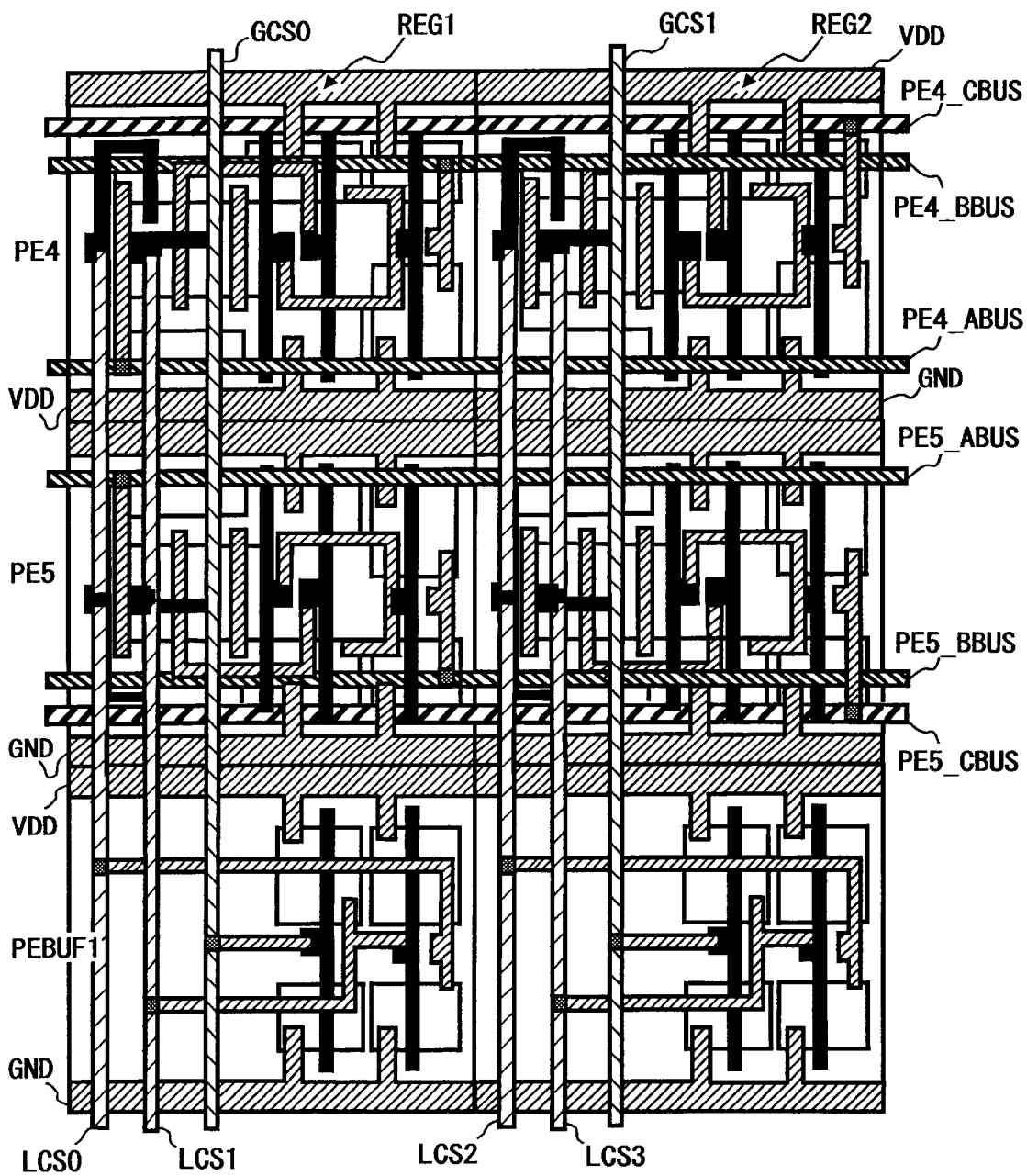
FIG. 7 includes a drawing illustrating the physical layout of the circuits of FIG. 4.

FIG. 7 includes a drawing illustrating the layout of the circuits of FIG. 4, in which the portions are shown corresponding to those of registers REG1 and REG2, including processor elements PE4 and PE5, and local signal generator (PEBUF1).

Incidentally, it is assumed five-layers metallization process for the circuit interconnection is feasible in the present embodiment.

The metallization interconnection constitutes a layered structure, and the electrical inter-layer connection is achieved by way of a hole called 'via' which is formed either parallel or perpendicular to the layer.

Figure 8:
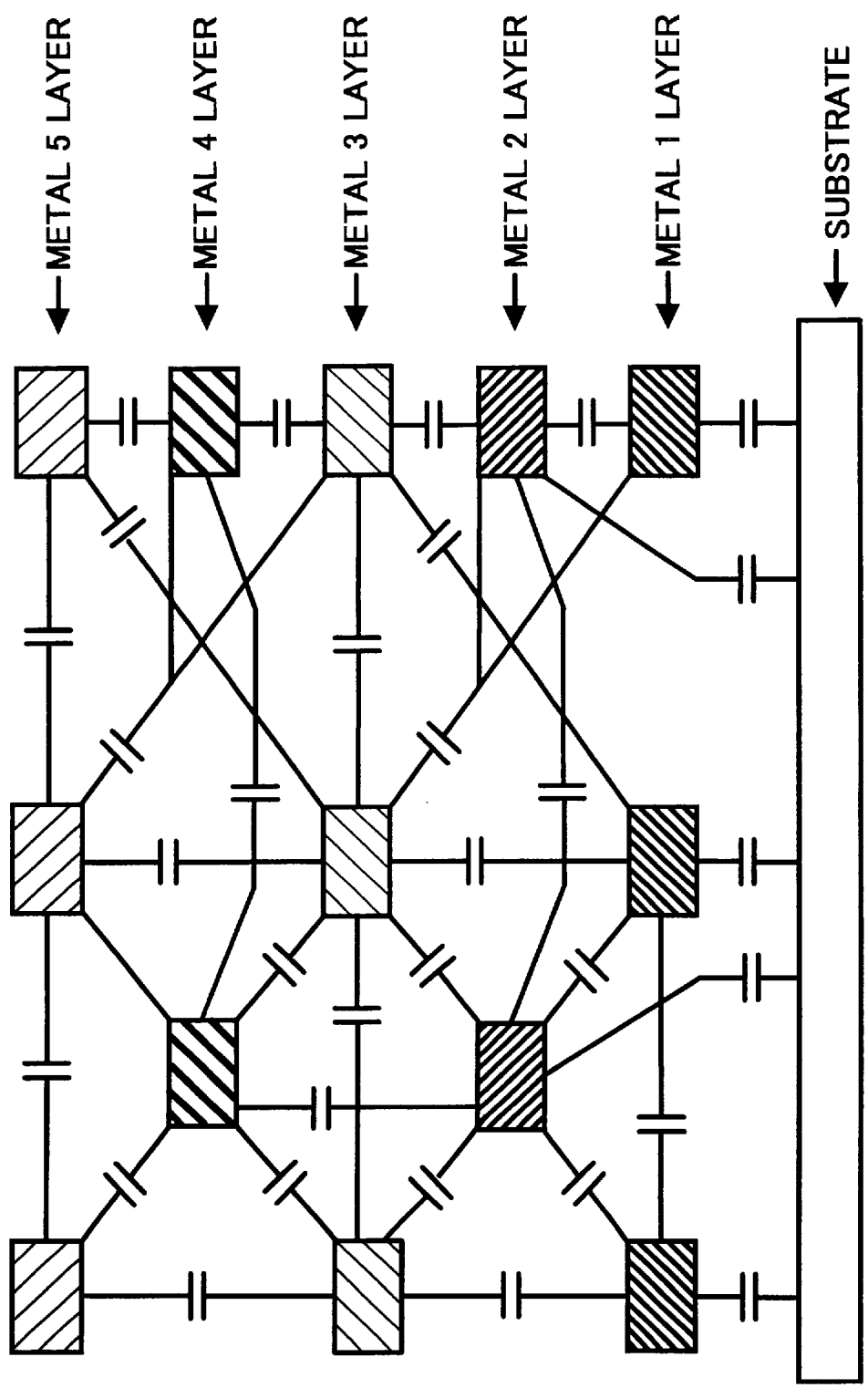
FIG. 8 is a schematic cross-sectional view illustrating the layered structure of the processor according to one embodiment disclosed herein.

FIG. 8 is a cross-sectional view illustrating the layered structure of the processor disclosed herein, in which a plurality of metallization layers are shown from the side of a silicon substrate, such as metallization layer 1 or metal 1 layer (lowermost layer), metal 2, metal 3, metal 4 and metal 5 (uppermost layer).

The layout in the PE is made according to the level of circuit construction, being constituted of units called macro-cells. The circuit arrangement in the macro-cell is typically illustrated in FIG. 6, in which power lines, VDD and GND, of the macro-cell are formed on metal 1 layer, and inter-cell connections are made also in metal 1 layer, as shown in FIG. 8.

Further, as shown also in FIG. 7, the bus lines PE4-ABUS, BBUS, CBUS; and PE5-ABUS, BBUS, CBUS (FIG. 5), are formed passing through horizontally. The bus lines are bus interconnections for use in transferring data among the processor elements 3a, which are formed on the metal layer 2 or 4.

The global control signals, GCS0 and GCS1, are supplied primarily through metal layer 5 (or uppermost layer) from the instruction sequence control unit in the global processor 2 to the local signal generator 50 (PEBUF1).

It is noted that the use of the metal 5 layer (or uppermost layer) for forming the global control signals, GCS0 and GCS1, is quite effective for reducing wiring delay, which follows.

Namely, the use of metal layers 1, 2, 3 and 4 in the present embodiment, excepting the uppermost layer 5, typically engenders parasitic capacitance, which is called coupling capacitance. This is induced by neighboring, either overlaying or underlying, metal layers including the substrate, as shown in FIG. 8.

The coupling capacitance results generally in wiring delay in signal lines. Since the uppermost layer 5 has no overlying layer, as shown in FIG. 8, coupling capacitance and concomitant wiring delay can be reduced, thereby suggesting the use of the uppermost metal 5 layer as relatively long connections passing through a number of processor elements.

Signals through the global control signal line GCS0 are input into the local signal generator 50 (PEBUF1), then generates the local control signals (LCS0, LCS1, LCS2 and LCS3 in FIG. 7). In addition, local control signals are formed in metal 3 layer and supplied to PE4, PE5, PE6 and PE7 within the GPE, then terminated.

As another illustrative embodiment, a SIMD processor for use in an image processing system such as, for example, a digital duplication machine is detailed herein below referring to FIGS. 9 through 11.

Figure 9:
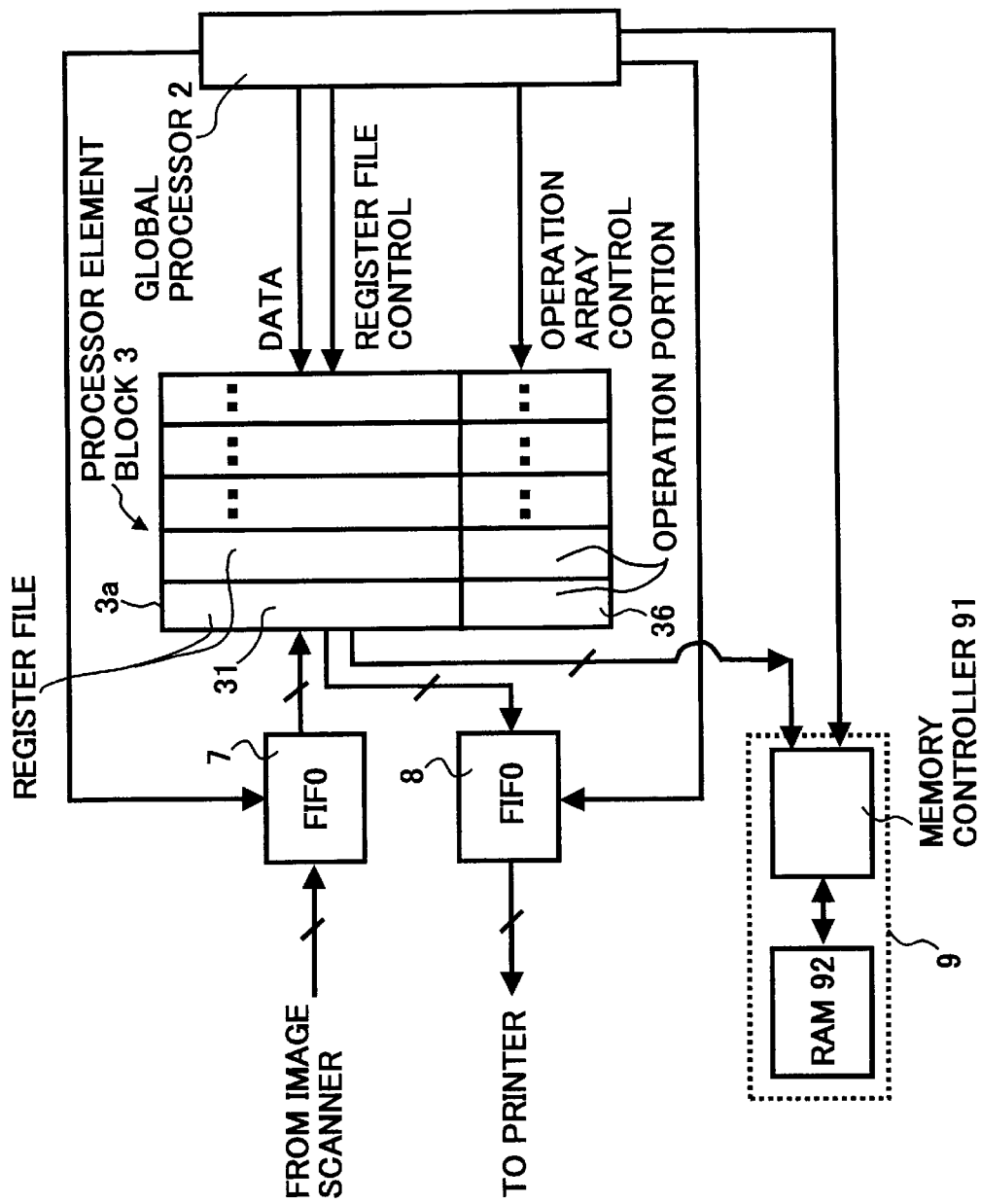
FIG. 9 is a block diagram illustrating the overall construction of an image processing system according to one embodiment disclosed herein.
Figure 10:
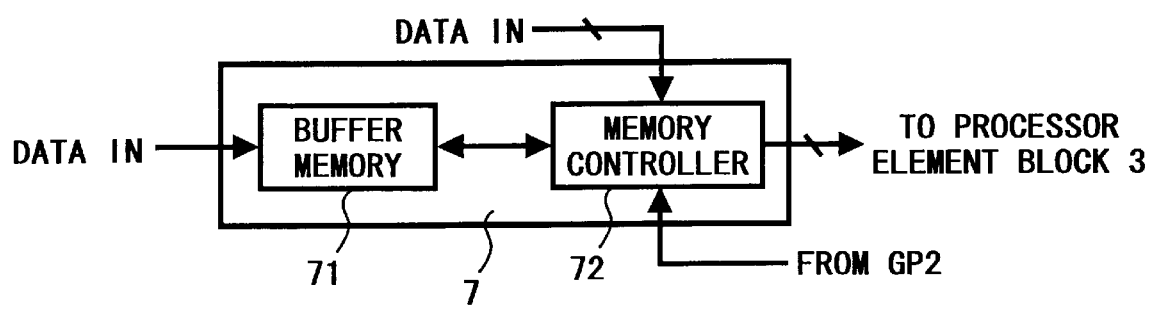
FIG. 10 is a block diagram illustrating the construction of an input FIFO memory according to one embodiment disclosed herein.
Figure 11:
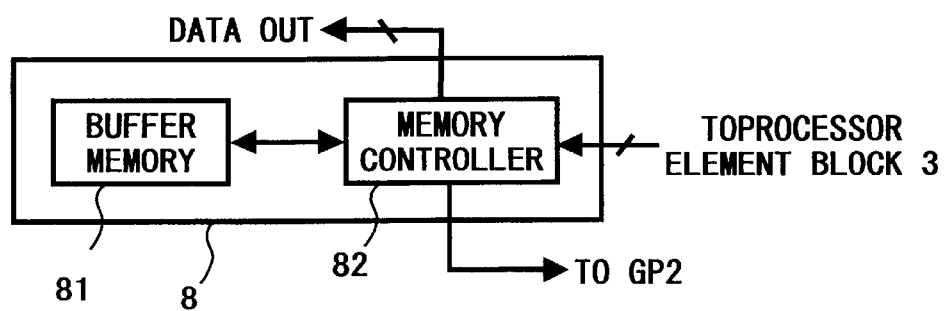
FIG. 11 is a block diagram illustrating the construction of an output FIFO memory according to one embodiment disclosed herein.
Figure 12:
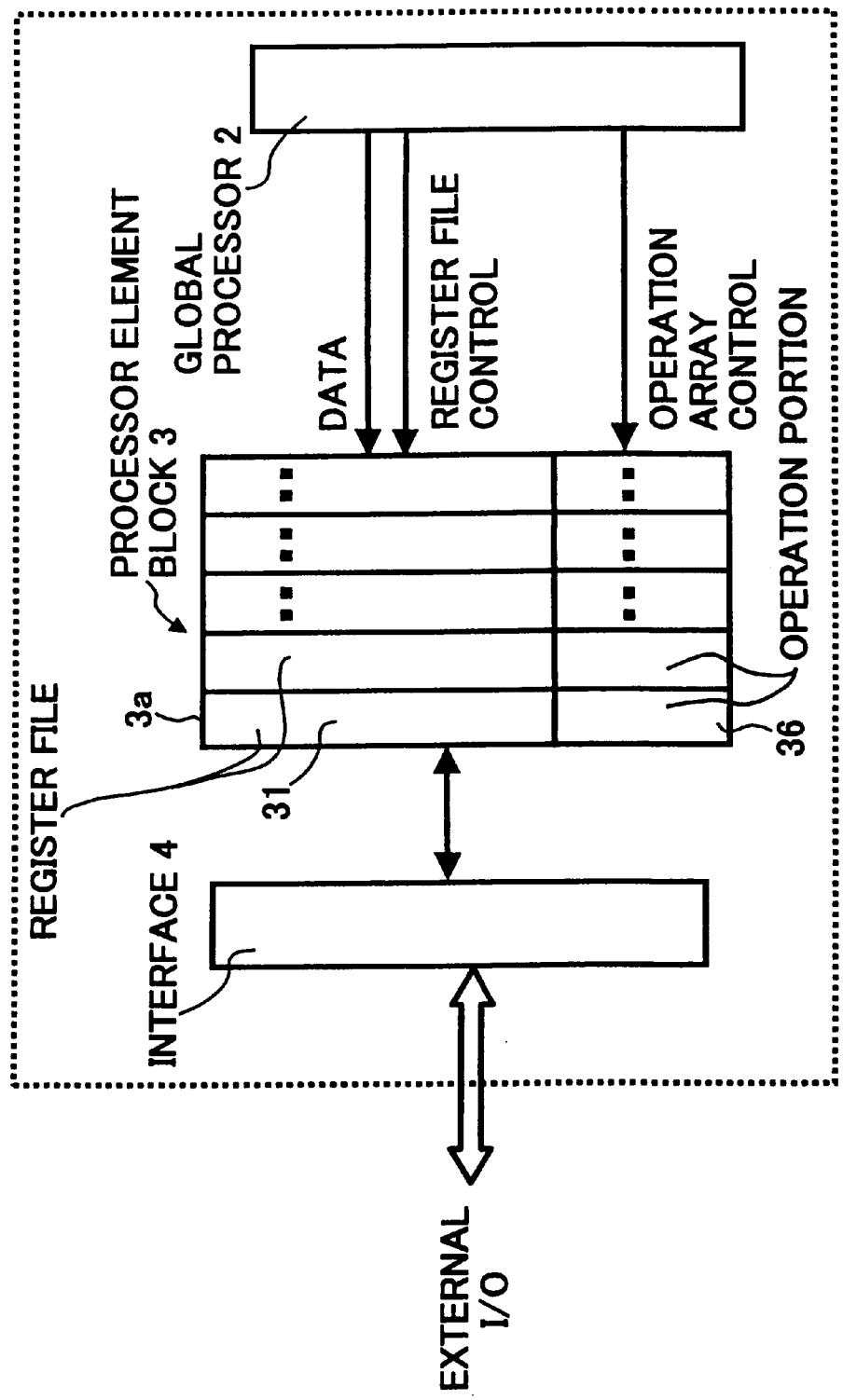
FIG. 12 is a block diagram of a known SIMD processor.

FIG. 9 is a block diagram illustrating the overall construction of an image processing system, FIG. 10 is a block diagram illustrating the construction of an input FIFO memory, FIG. 11 is a block diagram illustrating the construction of an output FIFO memory, according to one embodiment disclosed herein.

A variety of image data are read to form n-bits image data by an image scanner, and then supplied to FIFO memory 7 by way of an external bus. When the data corresponding to one scan line are stored in the FIFO memory 7, the image data, which are exemplified by 256 data in the present embodiment, are sent to the register file 31 in response to control signals from the global processor 2 in SIMD processor 1.

As described earlier, according to the present embodiment, the register file 31 contains 32 of 8-bits registers for each processor element 3a, to thereby constitute a register array containing those 32 registers for each of 256 PE's.

The register file 31 thus includes the plurality of registers R0, R1, R2, . . . R31 for each processor element (PE) 3a. In addition, each register file 31 is provided with one read port (QP) and one write port (D) for the operational array 36, and accessible from the operation array 36 by way of the 8-bits bus 37 used for both reading and writing.

Twenty-four of the 32 registers are accessible from the exterior of the processor, to thereby form an arbitrary register executed by read/write steps in response to externally input clock, address and read/write control signals.

Remaining 8 out of the 32 registers (R24~R31) are for use in temporarily storing the data for the PE operation, and also in writing various data transferred from, for example, table RAMs according to the instructions from the global processor 2. The writing steps of data are carried out by the operation array 36 in response to the write instructions from the global processor 2.

These processor elements (PE) 3a are further structured being divided into groups (GPE), each of which includes an arbitrary number of the processor elements 3a.

One local control signal generator 50 is provided for each group, and serves to buffer global control signals.

The local control signal generator 50 serves to buffer global control signals (GCS) generated by the instruction sequence control unit in the global processor 2, and to generate local control signals (LCS, LCS0~LCSp).

The local control signals (LCS) are supplied exclusively to each GPE as control signals for the processor element 3a, and the processor element 3a, in turn, carries out read/write steps in response to instructions from the global processor 2.

The operational array 36 contains 16-bits ALU 34, 16-bits A register and F register. The processing steps executed by the instructions from the processor element 3a are carried out by inputting the data readout from the register file 31 into one of two inputs of the ALU 34, inputting the content in the A register of the register 35 into the other input of the ALU 34, and subsequently storing the processed results into the A register. The processing steps are therefore carried out between the content in the A register 35a, and the data supplied by either R0~R31 registers or the global processor 2.

The aforementioned image data, which are transferred from the FIFO memory 7 and stored in the register file 31, are subsequently operation processed in the manner detailed in the earlier embodiment.

The thus processed data are then transferred to FIFO memory 8. When the resultant data corresponding to one scan line are stored in the FIFO memory 8, these image data, which are exemplified by 256 data in the present embodiment, are transferred to external output units such as, for example, a printer.

Alternately, the image data may be stored in a line memory 9, transferred from line memory 9 to processor element block 3, subjected to the non-linear operation process, and then storing resulting data in the line memory 9. During the above steps, the data transfer is achieved by inputting to, and outputting from, RAM92 by way of the memory controller 91.

The FIFO memories 7 and 8 are illustrated in FIGS. 10 and 11, respectively. The FIFO memory 7 includes at least a memory controller 72 and buffer memory 71, while FIFO memory 8 includes a memory controller 82 and buffer memory 81.

When the data corresponding to one scan line are stored in the buffer memory 71, inputting external data is carried out by storing the data in buffer memory 71 by way of memory controller 72 and transferring from memory controller 72 to processor element block 3.

Outputting the data to the exterior is carried out by storing the data into buffer memory 71 from processor element block 3 by way of memory controller 72, and transferring from memory controller 72 to an external unit, when the data corresponding to one scan line are stored in the buffer memory 71.

Although the image processing apparatus has been described herein above with reference to the case where various image data items are read by an image scanner, operation processed, and then are output to a printer, the use of the apparatus is by no means limited to the above illustrations. For example, the image processing apparatus may also be suitably used as various other means such as, for example, inputting image data by digital video or digital camera and then subjecting the data to the non-linear data processing operations.

Similarly, the outputting means is not limited to the printer illustrated above, but various other means may also be utilized such as, various display units provided with the data output and transfer capabilities, for example.

It is apparent from the above description, the parallel processor and the image processing system disclosed herein have several advantages over similar processors and systems previously known.

For example, the control signals, which are generated by the instruction sequence control unit, are divided into two and then supplied, in which the ones are global control signals supplied to local signal generator of arbitrary selected processor element group, and the others are local control signals which are buffered by the local control signal generator and then supplied exclusively to the processor elements included in arbitrary selected processor element group.

As a result, the control signals can be supplied exclusively to arbitrary selected processor element groups, the size of the buffer portion in the single instruction sequence control unit and the number of the global signal lines can be reduced, and signal skew can be alleviated as indicated earlier.

Further, since the circuit interconnection for the global control signals is provided in the uppermost metal layer in the IC layout process, coupling capacitance and concomitant wiring delay can be reduced.

Still further, by the above use of the uppermost metal layer in the IC layout process together with the aforementioned decrease in the number of the global signal lines, the pitch for circuit layout can be widened, to thereby result in reduction in cross talk effects which are primarily signal delay caused by signal fluctuation in neighboring circuit lines. The above use of the uppermost metal layer is effective also from the view points of shielding, since the uppermost metal layer is utilized also for wiring the aforementioned power lines.

Obviously, additional modifications and variations are possible in light of the above teachings. It is therefore to be understood that within the scope of the appended claims, the invention may be practiced other than as specifically described herein.

This document claims priority and contains subject matter related to Japanese Patent Application No. 2000-36938, filed with the Japanese Patent Office on Feb. 15, 2000, the entire contents of which are hereby incorporated by reference.

What is claimed as new and desired to be secured by Letters Patent of the United States is:

1. A parallel processor comprising:
    a global processor configured to decode programs and assume overall control of said parallel processor; and
    a processor element block comprising a plurality of processor elements configured to process a variety of data,
    wherein
        each of said processor elements comprises a plurality of functional means including at least an operation unit and a register file provided with a plurality of registers,
        each of said functional means is connected to an internal bus,
        an operation of said functional means is controlled by a logic of global control signals generated by said global processor,
        said processor elements are divided into groups each including an arbitrary number thereof,
        buffer means to buffer said control signals is provided in each of said groups,
        said global control signals are input into said buffer means,
        local control signals are generated by said buffer means,
        said local control signals are sent to each of said groups to be subsequently terminated within each of said groups, and
        said global control signals are provided to all of said buffer means in said groups.

2. The parallel processor according to claim 1, wherein
    a transfer and an exchange of data among said functional means are carried out by way of said internal bus.

3. The parallel processor according to claim 1, wherein
    said buffer means is provided in a middle of said group of an arbitrary number of said processor elements.

4. The parallel processor according to claim 1, wherein
    a circuit interconnection for said global control signals is provided in an uppermost metal layer in an IC layout process,
    said global control signals are input into said buffer means included in said group of an arbitrary number of said processor elements, and
    an operation of said functional means in said group of an arbitrary number of said processor elements is controlled by said local control signals generated by said buffer means.

5. The parallel processor according to claim 1, wherein
    said circuit interconnection for said global control signals is provided in an uppermost metal layer in an IC layout process.

6. The parallel processor according to claim 5, wherein
    said circuit interconnection for said global control signals is shielded by power lines.

7. An image processing system configured to input image data, operate to parallel process said image data, and output processed data to an external unit, comprising:
    a parallel processor comprising a plurality of processor elements provided to form an array for said image data to be input; and
    a FIFO memory to perform at least one of an inputting operation of said image data and an outputting operation of said processed data to said external unit, by way thereof,
    wherein
        each of said processor elements comprises a plurality of functional means including at least an operation unit and a register file provided with a plurality of registers,
        each of said functional means is connected to an internal bus,
        a transfer and an exchange of data among said functional means are carried out by way of said internal bus, an operation of said functional means is controlled by a logic of global control signals generated by said global processor, said processor elements are divided into groups each including an arbitrary number thereof, buffer means to buffer said control signals is provided in each of said groups, said global control signals are input into said buffer means, local control signals are generated by said buffer means, said local control signals are sent to each of said groups to be subsequently terminated within said each of said groups, said global control signals are provided to all of said buffer means in said groups, and said processed data are output to said external unit in response to said global control signals.

8. The image processing system according to claim 7, wherein said buffer means is provided in a middle of said group of an arbitrary number of said processor elements.

9. The image processing system according to claim 7, wherein a circuit interconnection for said global control signals is provided in an uppermost metal layer in an IC layout process, said global control signals are input into said buffer means included in said group of an arbitrary number of said processor elements, and an operation of said functional means in said group of an arbitrary number of said processor elements is controlled by said local control signals generated by said buffer means.

10. The image processing system according to claim 7, wherein said circuit interconnection for said global control signals is provided in an uppermost metal layer in an IC layout process.

11. The image processing system according to claim 7, wherein said circuit interconnection for said global control signals is shielded by power lines.

12. A method for inputting image data, operating to parallel process said image data, and outputting processed data to an external unit, for an image processing system, comprising the steps of:

inputting said image data into a parallel processor comprising a plurality of processor elements provided forming an array;

performing at least one of inputting operation of said image data and an outputting operation of said processed data to said external unit, by way a FIFO memory;

wherein each of said processor elements comprises a plurality of functional means including at least an operation unit and a register file provided with a plurality of registers, each of said functional means is connected to an internal bus, a transfer and an exchange of data among said functional means are carried out by way of said internal bus, an operation of said functional means is controlled by a logic of global control signals generated by said global processor, said processor elements are divided into groups each including an arbitrary number thereof, buffer means to buffer said control signals is provided in each of said groups, said global control signals are input into said buffer means, local control signals are generated by said buffer means, said local control signals are sent to each of said groups to be subsequently terminated within said each of said groups, said global control signals are provided to all of said buffer means in said groups, and said processed data are output to said external unit in response to said global control signals.

13. The method according to claim 12, wherein said buffer means is provided in a middle of said group of an arbitrary number of said processor elements.

14. The method according to claim 12, wherein a circuit interconnection for said global control signals is provided in an uppermost metal layer in an IC layout process, said global control signals are input into said buffer means included in said group of an arbitrary number of said processor elements, and an operation of said functional means in said group of an arbitrary number of said processor elements is controlled by said local control signals generated by said buffer means.

15. The method according to claim 12, wherein said circuit interconnection for said global control signals is provided in an uppermost metal layer in an IC layout process.

16. The method according to claim 12, wherein said circuit interconnection for said global control signals is shielded by power lines.

17. A parallel processor comprising:

global processor means for decoding programs and assuming overall control of said parallel processor; and processor element block means comprising a plurality of processor element means for processing various data, wherein each of said processor element means comprises a plurality of functional means including at least an operation unit and register file provided with a plurality of registers, each of said functional means is connected to an internal bus, an operation of said functional means is controlled by a logic of global control signals generated by said global processor, said processor elements are divided into groups each including an arbitrary number thereof, buffer means to buffer said control signals is provided in each of said groups, said global control signals are input into said buffer means, local control signals are generated by said buffer means, said local control signals are sent to each of said groups to be subsequently terminated within each of said groups, and said global control signals are provided to all of said buffer means in said groups.

18. The parallel processor according to claim 17, wherein
said buffer means is provided in a middle of said group of an arbitrary number of said processor elements.

19. The parallel processor according to claim 17, wherein
a circuit interconnection for said global control signals is provided in an uppermost metal layer in an IC layout process,
said global control signals are input into said buffer means included in said group of an arbitrary number of said processor elements, and
an operation of said functional means in said group of an arbitrary number of said processor elements is controlled by said local control signals generated by said buffer means.

20. An image processing system configured to input image data, operate to parallel process said image data, and output processed data to external means, comprising:
parallel processor means comprising a plurality of processor elements provided forming array means for said image data to be input; and
FIFO memory means for performing at least one of an inputting operation of said image data and an outputting operation of said processed data to said external means, by way thereof,
wherein
each of said processor elements comprises a plurality of functional means including at least an operation unit and a register file provided with a plurality of registers,
each of said functional means is connected to an internal bus,
a transfer and an exchange of data among said functional means are carried out by way of said internal bus,
an operation of said functional means is controlled by a logic of global control signals generated by said global processor,
said processor elements are divided into groups each including an arbitrary number thereof,
buffer means to buffer said control signals is provided in each of said groups,
said global control signals are input into said buffer means,
local control signals are generated by said buffer means,
said local control signals are sent to each of said groups to be subsequently terminated within each of said groups,
said global control signals are provided to all of said buffer means in said groups, and
said processed data are output to said external unit means in response to said global control signals.

21. The image processing system according to claim 20, wherein
said buffer means is provided in a middle of said group of an arbitrary number of said processor elements.

22. The image processing system according to claim 20, wherein
a circuit interconnection for said global control signals is provided in an uppermost metal layer in an IC layout process,
said global control signals are input into said buffer means included in said group of an arbitrary number of said processor elements, and
an operation of said functional means in said group of an arbitrary number of said processor elements is controlled by said local control signals generated by said buffer means.

23. The image processing system according to claim 20, wherein
said circuit wiring for said global control signals is provided in an uppermost metal layer in an IC layout process, and shielded by power lines.

* * * * *